United States Patent
Tinnin et al.

(10) Patent No.: US 9,205,859 B2
(45) Date of Patent: Dec. 8, 2015

(54) INTERMEDIATE SHAFT CONNECTION ASSURANCE DEVICE

(75) Inventors: Melvin L. Tinnin, Clio, MI (US); Todd M. King, Saginaw, MI (US); Thomas M. Finney, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 68 days.

(21) Appl. No.: 13/611,067

(22) Filed: Sep. 12, 2012

(65) Prior Publication Data

US 2013/0064603 A1 Mar. 14, 2013

Related U.S. Application Data

(60) Provisional application No. 61/534,244, filed on Sep. 13, 2011.

(51) Int. Cl.
  *F16D 1/08* (2006.01)
  *F16D 3/38* (2006.01)
  *B62D 1/20* (2006.01)

(52) U.S. Cl.
  CPC .............. B62D 1/20 (2013.01); F16D 1/0864 (2013.01); F16D 3/387 (2013.01); *Y10T 403/1624* (2015.01); *Y10T 403/581* (2015.01); *Y10T 403/7188* (2015.01)

(58) Field of Classification Search
  CPC .............. B62D 1/16; B62D 1/20; F16C 3/20; F16C 11/12; F16D 1/076; F16D 1/08; F16D 1/0805; F16D 1/0864; F16D 3/387
  USPC ......... 403/1, 13, 14, 290, 315, 316, 398, 399, 403/289; 464/182; 280/775, 777, 779, 780; 74/492
  See application file for complete search history.

(56) References Cited

U.S. PATENT DOCUMENTS

| | | | | |
|---|---|---|---|---|
| 4,899,611 | A | * | 2/1990 | Pinna ............................... 403/14 |
| 5,628,578 | A | * | 5/1997 | McClanahan et al. ......... 403/290 |
| 6,155,739 | A | * | 12/2000 | Sekine et al. ................... 403/12 |
| 6,322,274 | B1 | * | 11/2001 | Binotti et al. ................... 403/13 |
| 6,692,177 | B2 | * | 2/2004 | Crudele et al. .................. 403/12 |
| 7,318,687 | B2 | * | 1/2008 | Appleyard et al. ............ 403/398 |
| 7,445,242 | B2 | * | 11/2008 | Yamaguchi et al. .......... 280/779 |
| 8,328,648 | B2 | * | 12/2012 | Molinar et al. ............... 464/136 |

FOREIGN PATENT DOCUMENTS

| | | | |
|---|---|---|---|
| DE | 8814897.1 U1 | 3/1989 | |
| DE | 4013810 | * 10/1991 | ............... B62D 1/16 |

(Continued)

OTHER PUBLICATIONS

German Search Report; German Application No. 10 2012 216 167.8; Dated: Dec. 18, 2013; 7 pages.

(Continued)

*Primary Examiner* — Josh Skroupa
(74) *Attorney, Agent, or Firm* — Cantor Colburn LLP (57) ABSTRACT

An intermediate steering shaft connection assembly for a steering column is provided. The intermediate steering shaft connection assembly comprises at least one shaft, a clamping yoke configured to be coupled to the shaft, and a connection assurance device interposed between the shaft and the clamping yoke. The connection assurance device is configured to ensure proper positioning of the clamping yoke on the shaft to allow for final assembly.

18 Claims, 5 Drawing Sheets

(56) References Cited

FOREIGN PATENT DOCUMENTS

| DE | 60204613 T2 | 5/2006 |
| DE | 602004006452 T2 | 2/2008 |
| FR | 2749623 A1 | 12/1997 |
| WO | 2004063587 A1 | 7/2004 |

OTHER PUBLICATIONS

English Translation of German Search Report, German Application No. 10 2012 216 167.8; Dated: Dec. 18, 2013; 7 pages.

English language translation of FR2749623 (A1) extracted from espacenet.com on Oct. 23, 2014; 8 pages.

* cited by examiner

INTERMEDIATE SHAFT CONNECTION ASSURANCE DEVICE

CROSS-REFERENCES TO RELATED APPLICATIONS

This patent application claims priority to U.S. Provisional Patent Application Ser. No. 61/534,244, filed Sep. 13, 2011, which is incorporated herein by reference in its entirety.

BACKGROUND OF THE INVENTION

The following description relates to connection for an intermediate shaft in steering column, and in particular, an assurance device used in the connection for an intermediate shaft.

An intermediate shaft is commonly positioned in a steering column between an output shaft of the steering column and an input shaft of a steering gear. The intermediate shaft is used to transfer steering torque from the output shaft to the input shaft of the steering gear.

A conventional intermediate shaft may include a tubular shaft element and a solid shaft element telescoped into the tubular shaft element. The tubular shaft element and solid shaft element may be coupled together with corresponding splines so that rotation may be transferred between the tubular shaft element and solid shaft element. Relative axial movement between the tubular shaft element and solid shaft element is permitted.

The intermediate shaft also includes a first inner yoke rigidly attached at a first end of the intermediate shaft. The first inner yoke is coupled to a first outer yoke of the input shaft of the steering gear. A second inner yoke is rigidly attached to the intermediate shaft at a second end of the intermediate shaft. The second inner yoke is coupled to a second outer yoke of the output shaft of the steering column.

However, a condition of the coupling formed by the respective outer yokes at the input shaft of the steering gear and the output shaft of the steering column cannot be reliably detected. That is, the first and second outer yokes may be installed at improper positions on the respective input and output shafts. The improperly attached outer yokes may be prone to failing. As such, safety and reliability issues may exist.

Accordingly, it is desirable to a system where the connections between the intermediate shaft, input shaft of the steering gear and output shaft of the steering column may be reliably determined.

SUMMARY OF THE INVENTION

According to an exemplary embodiment of the present invention, there is provided an intermediate steering shaft connection assembly for a steering column including at least one shaft extending along a first axis, a clamping yoke configured to be coupled to the shaft, and a connection assurance device interposed between the shaft and the clamping yoke.

According to another exemplary embodiment of the present invention, there is provided a connection assurance device for properly positioning a clamping yoke on a shaft of an intermediate steering shaft connection assembly. The connection assurance device includes a first plate having a shaft opening formed therein, the shaft opening having a first axis extending therethrough and configured to receive a mounting portion of the shaft, and a second plate connected to and extending from the first plate in a direction of the first axis, the second plate having a securing hole formed therein configured to receive a fastener, the securing hole having a second axis extending therethrough, the second axis spaced from the first axis and extending in a direction perpendicular to the first axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, an intermediate steering shaft connection assembly 10 includes at least one shaft. For example, the intermediate steering shaft connection assembly 10 may include an input shaft 11 of a steering gear having a connection assurance device 20 positioned thereon. The connection assurance device 20 may be used to ensure proper positioning of an outer clamping yoke 30 on the input shaft 11 of the steering gear. The intermediate steering shaft connection assembly 10 may also include an output shaft 12 of a steering column having another connection assurance device 20 positioned thereon. The intermediate steering shaft connection assembly 10 may further include an intermediate shaft (not shown) interfaces with the input shaft 11 of the steering gear and the output shaft 12 of the steering column, and extends between the input shaft 11 and the out shaft 12.

Figure 1:
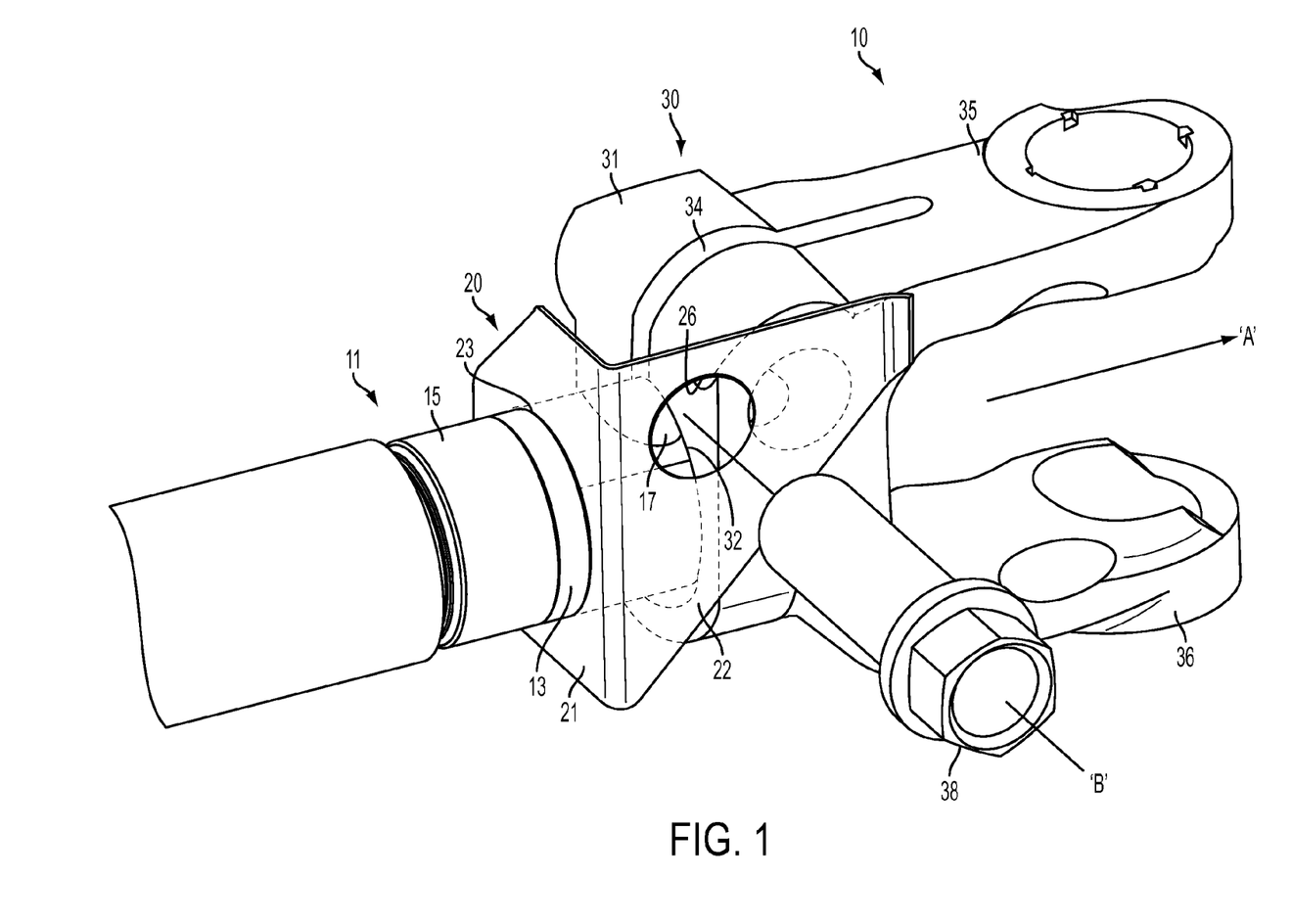
FIG. 1 is perspective view of one end of an input shaft of a steering gear prior to final assembly according to an exemplary embodiment of the present invention.
Figure 2:
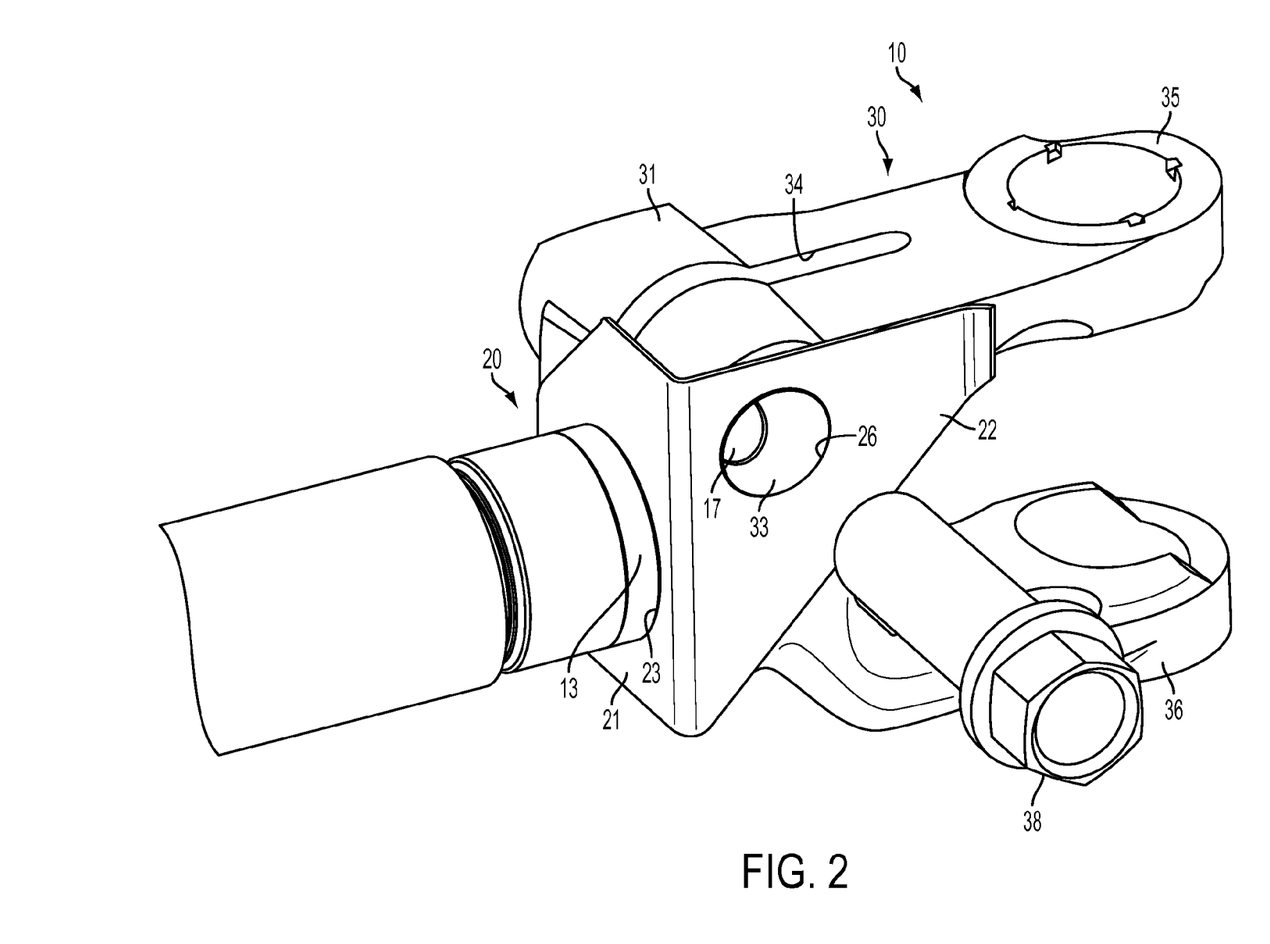
FIG. 2 is perspective view of one end of an input shaft of a steering gear with components correctly positioned for final assembly according to an exemplary embodiment of the present invention.
Figure 3:
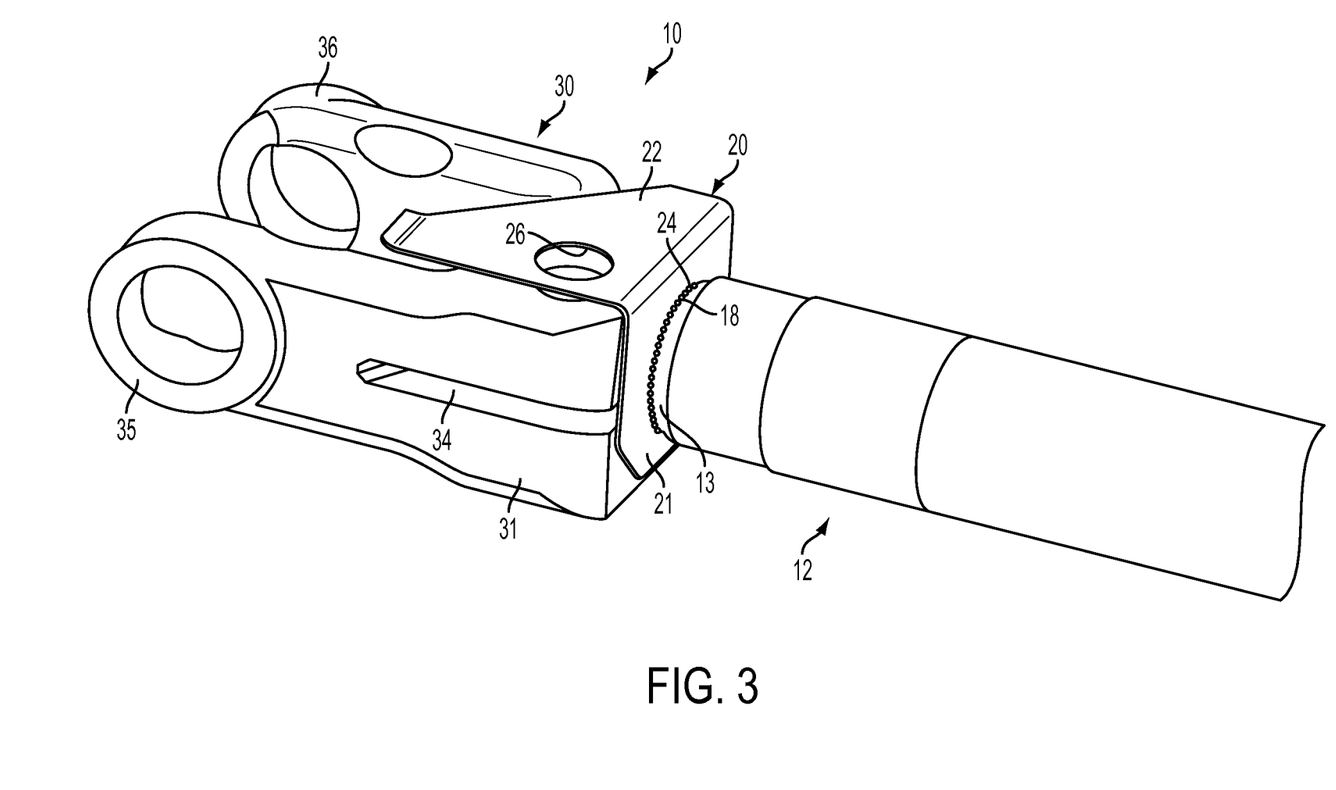
FIG. 3 is perspective view of an end of output shaft of a steering column with components correctly positioned for final assembly according to an exemplary embodiment of the present invention.

With reference to FIGS. 1-3, the input shaft 11 (FIGS. 1 and 2) of the steering gear and the output shaft 12 (FIG. 3) of the steering column each extend along a first axis 'A'. In an exemplary embodiment, the input shaft 11 and output shaft 12 each include a mounting portion 13 configured for coupling with the connection assurance device 20 and the outer clamping yoke 30, and in turn, the intermediate shaft (not shown). The intermediate shaft includes a solid shaft (not shown) and a tubular shaft (not shown). The solid shaft is telescopically received within the tubular shaft and is movable in an axial direction along the first axis 'A' relative to the tubular shaft. A first end of the intermediate shaft includes a first inner yoke (not shown) that is configured to be coupled to the outer clamping yoke 30 which is intended to interface with the mounting portion 13 of the of the input shaft 11. A second end of the intermediate shaft includes a second inner yoke (not shown) that is configured to be coupled to the outer clamping yoke 30 which is intended to interface with the mounting portion 13 of the output shaft 12. Accordingly, the intermediate shaft, at the first end may be coupled to the input shaft 11 of the steering gear, and at the second end, maybe be coupled to the output shaft 12 of the steering column.

The mounting portion 13 may be formed at one of, or both of the input shaft 11 and output shaft 12. In an exemplary embodiment, the mounting portion 13 is formed identically on the input shaft 11 of the steering gear and the output shaft 12 of the steering column. It understood that variations in dimensions and/or orientation of the mounting portion 13 are permitted depending on whether it is formed on the input shaft or output shaft. It is also understood that any structural variations of the mounting portion 13 may be applied to only one of, or both the mounting portion 13 of input shaft 11 and output shaft 12 in the exemplary embodiments below. For convenience, in the description the below, the mounting portion 13 of the input shaft 11 and the mounting portion 13 of the output shaft 12 are described together.

The mounting portion 13 extends partially along a length of the respective input shaft 11 and output shaft 12. The mounting portion 13 is configured to have the connection assurance device 20 and clamping yoke 30 coupled thereto. In an exemplary embodiment, the mounting portion 13 includes at least one flat surface 16 positioned along an outer circumference. The mounting portion 13 also includes a cutout or groove 17, also referred to as a whistle notch, extending transversely across the mounting portion 13, generally orthogonal to the first axis 'A' and in the direction of a second axis 13'.

Figure 5:
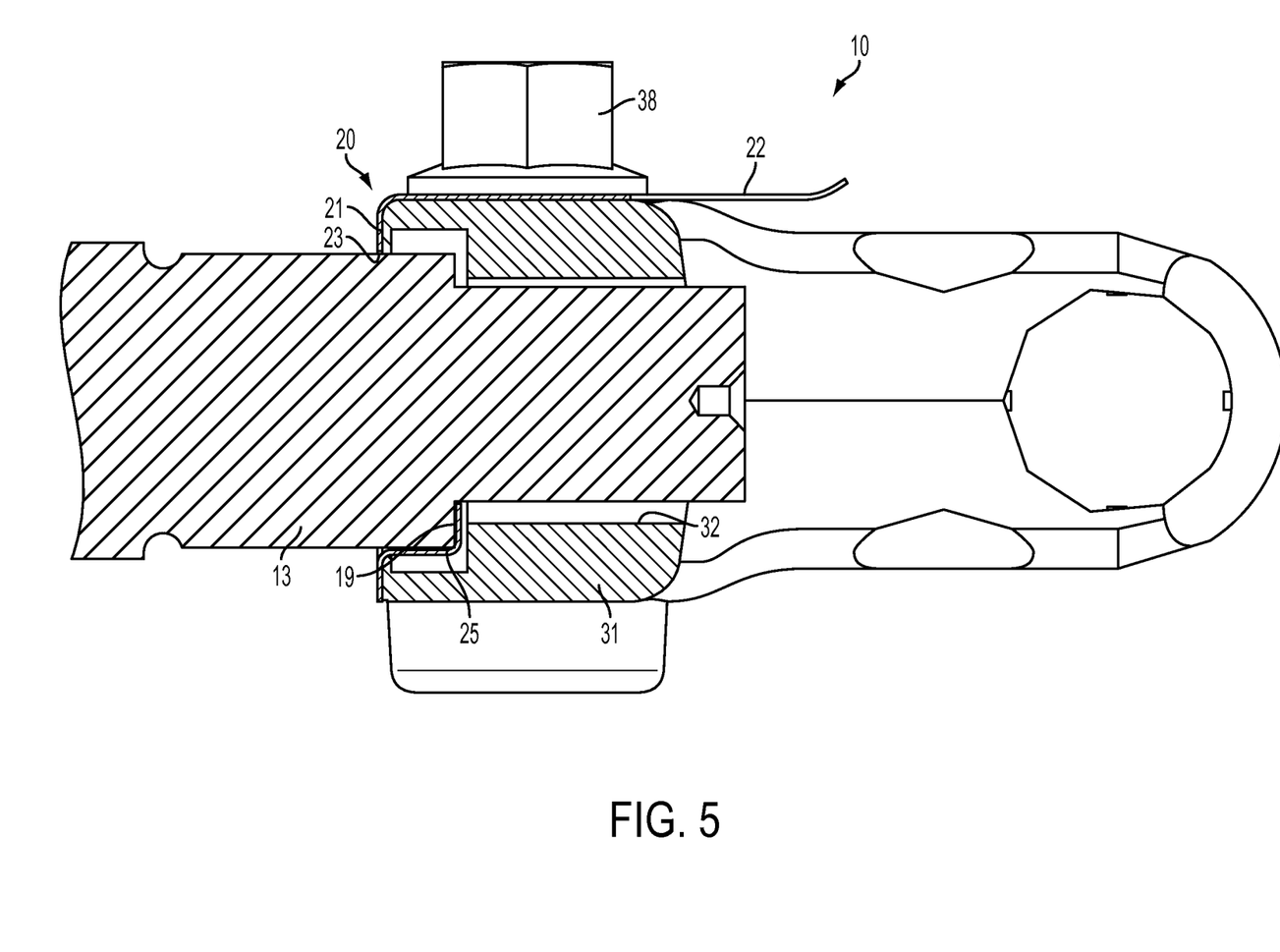
FIG. 5 is a top section view of the input shaft in a final assembled condition according to an exemplary embodiment of the present invention.

In an exemplary embodiment, and with reference to FIGS. 3 and 5, the mounting portion 13 may include a splined segment 18 (FIG. 3) and an axially facing wall 19 (FIG. 5). The splined segment 18 and axially facing wall 19 may be used for proper positioning and mounting of the connection assurance device 20 as described further below. Alternatively, or in addition to, at least one flat surface 16 may be used for proper positioning and mounting of the connection assurance device 20 on the mounting portion 13.

With further reference to FIGS. 1-3, the connection assurance device 20 is a generally asymmetric bracket and includes a first plate 21 and a second plate 22. In an exemplary embodiment, the first plate 21 is asymmetric in shape and includes a shaft opening 23 through which the mounting portion 13 extends so that the first plate 21 may be mounted on the input shaft 11 and/or output shaft 12. In an exemplary embodiment, the shaft opening 23 through the first plate 21 may include a plurality of splines 24 (FIG. 3). The plurality of splines 24 of the shaft opening 23 may correspond to the splined segment 18 of the mounting portion 13 to rotationally fix the connection assurance device 20 relative to the input shaft 11 and/or output shaft 12.

Figure 4:
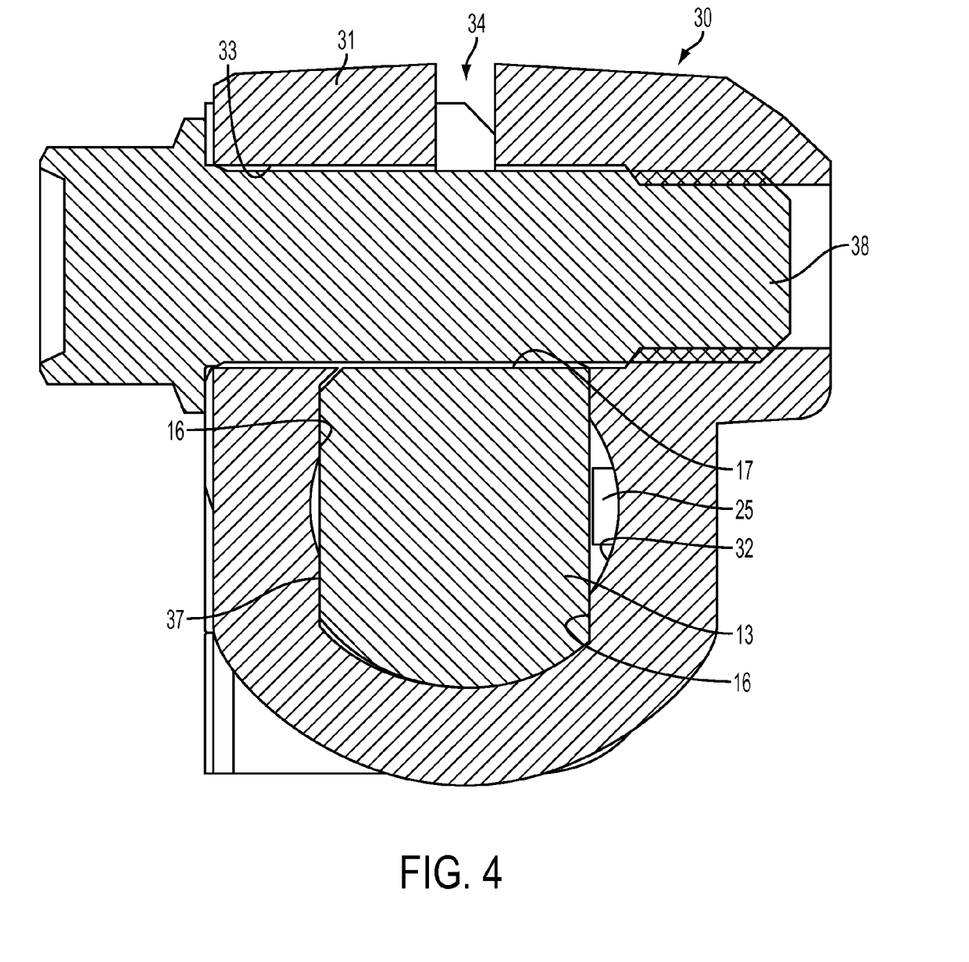
FIG. 4 is front section view of the input shaft at an end coupled to the intermediate shaft in an assembled condition taken at a first axial position according to an exemplary embodiment of the present invention.

With reference to FIGS. 4 and 5, the first plate 21 may also include a tab 25 positioned proximate to the shaft opening 23. In an exemplary embodiment, the tab 25 may extend a first axial distance then project radially inward. With the connection assurance device 20 positioned on the mounting portion 13, the tab 25 comes into contact with the axially facing wall 19 of the mounting portion 13 to ensure a proper axial position of the connection assurance device 20 on the input shaft 11 and/or output shaft 12.

Referring again to FIGS. 1-3, the second plate 22 is connected to the first plate 21 and extends therefrom generally in a direction of the first axis 'A'. In an exemplary embodiment, the second plate 22 extends generally orthogonal from the first plate 21. Also, in an exemplary embodiment, the second plate 22 may be asymmetrically shaped as, for example, a triangle or a trapezoid. It is understood however that these shapes are only examples, and the present invention is not limited thereto.

A securing hole 26 extends through the second plate 22 generally perpendicular to, but offset from the axis 'A'. That is, the securing hole 26 is centered about a second axis 13' that extends generally perpendicular to the first axis 'A', but is spaced therefrom so as to not intersect the first axis 'A'.

It is understood that a connection assurance device 20 may be mounted on both the input shaft 11 of the steering gear and the output shaft 12 of the steering column, where the input shaft 11 and output shaft 12 each include a mounting portion 13. Alternatively, the connection assurance device 20 may be mounted at only one of the input shaft 11 or output shaft 12.

Referring to FIGS. 1-4, the clamping yoke 30 may be coupled to the input shaft 11 or output shaft 12 at the mounting portion 13. In an exemplary embodiment, the clamping yoke 30 includes a base section 31, a mounting bore 32 extending through the base section 31, a fastening bore 33, a clamping slot 34 formed in the base section 31, a first attachment arm 35 and a second attachment arm 36.

The base section 31 is configured to allow the clamping yoke 30 to be coupled to the mounting portion 13 as described below. The mounting bore 32 extends through the base section along the axis 'A' of the input shaft 11 or output shaft 12 during installation and when coupled to input shaft 11 or output shaft 12. The mounting bore 32 is configured to receive the mounting portion 13. Referring to FIG. 4, the mounting bore 32 may include a flat portion 37 along its inner periphery that corresponds to the flat surface 16 of the mounting portion 13. The flat portion 37 is aligned with the flat surface 16 for proper positioning of the clamping yoke 30 relative to the input shaft 11 or output shaft 12 and to limit relative rotation between the clamping yoke 30 and the respective input shaft 11 and/or output shaft 12.

As shown in FIGS. 1 and 2, the fastening bore 33 extends through the base section 31 of the clamping yoke 30 in a direction generally orthogonal, and offset from to the axis 'A'. When properly installed, the fastening bore 33 is aligned with the securing hole 26 and extends along the second axis 'B'. The fastening bore 33 extends through the clamping slot 34. The fastening bore 33 and clamping slot 34 are in communication with the mounting bore 32. The fastening bore 33 is configured to receive a fastener 38.

The first attachment arm 35 and second attachment arm 36 extend generally parallel to one another from the base section 31. Each attachment arm 35, 36 includes an attachment arm opening. The first and second attachment arms 35, 36 are spaced apart from one another and are configured to be coupled to a corresponding yoke of a the intermediate shaft.

It is understood that a clamping yoke 30 may be provided at and is intended to interface with the respective mounting portions 13 of both the input shaft 11 and the output shaft 12. Alternatively, the clamping yoke 30 may be positioned at only the input shaft 11 or output shaft 12.

Referring to FIG. 4, the clamping yoke 30 may be secured to the mounting portion 13 by aligning the at least one flat surface 16 of the mounting portion 13 and the flat portion 37 of the mounting bore 32 and inserting the mounting portion 13 into the mounting bore 32. In an exemplary embodiment, the fastener 38 is threaded and the fastening bore 33 is threaded. The fastener 38 is threadably received within the fastening bore 33. As the fastener 38 is rotated in the fastening bore 33, a width of the clamping slot 34 is reduced as portion of the section 31 on opposite sides of the clamping slot 34 are drawn toward each other under the force of the threaded fastener 38 in the fastening bore 33. Accordingly, as the width of the clamping slot 34 is reduced, the base section 31 applies a clamping force to the mounting portion 13, thereby clamping the clamping yoke to the input shaft 11 or output shaft 12.

In use, the connection assurance device 20 is configured to ensure proper positioning of the clamping yoke 30 on the input shaft 11 or output shaft 12 before final assembly of the intermediate steering shaft assembly. The connection assurance device 20 is mounted on the input shaft 11 or output shaft 12 by inserting the mounting portion 13 through the shaft opening 23 of the connection assurance device 20 as shown in FIG. 1, for example.

Referring to FIGS. 4 and 5, the tab 25 of the connection assurance device 20 may be aligned with a flat surface, such as flat surface 16, of the mounting portion 13 for proper positioning of the connection assurance device 20 on the input shaft 11 or output shaft 12. Further, the tab 25 comes into contact with the axially facing wall 19 of the mounting portion 13 when a proper axial position is reached as shown in FIG. 5.

Referring to FIG. 3, the plurality of splines 24 engaged between splines of the splined segment 18 of the mounting portion to secure the connection assurance device against rotation relative to the intermediate shaft. Alternatively, the shaft opening 23 of the first plate 21 may include a flat portion or projection corresponding to a flat portion or recess of the mounting portion 13 to hold the connection assurance device 20 against rotation. Referring to FIGS. 2-4, with the connection assurance device 20 properly installed on the input shaft 11 or output shaft 12, the securing hole 26 is aligned with the cutout or groove 17 on the mounting portion 13.

The clamping yoke 30 may be installed on the input shaft 11 of the steering gear or the output shaft 12 of the steering column by inserting the mounting portion 13 into the mounting bore 32 as shown in FIGS. 1 and 2. An outer periphery of the mounting portion 13 may extend through, or intersect, the fastening bore 33 as well as shown in FIG. 3. When the clamping yoke 30 is properly positioned on the input shaft 11 or output shaft 12 as in FIG. 2, the fastening bore 33 is aligned with the securing hole 26 and groove 17. Accordingly, the fastener 38 may be inserted through the securing hole 26 into the fastening bore 33 and through the groove 17 as shown in FIG. 4. Accordingly, the fastener 38 may be threadably engaged in the fastener bore 33 and tightened to clamp that clamping yoke 30 to the input shaft 11 or output shaft 12.

If the clamping yoke 30 is improperly positioned on the mounting portion 13 in an axial direction, as shown in FIG. 1, the fastening bore 33 is not aligned with the securing hole 26. Accordingly, with the clamping yoke 30 at an improper axial position the fastener 38 may not be inserted through both the securing hole 26 and fastening bore 38. Thus, the axial position of the clamping yoke 30 may then be adjusted to the proper axial position and final assembly may be completed. Likewise, if the clamping yoke 30 is installed on the input shaft 11 or output shaft 12 at an improper rotational position, the securing hole 26 and fastening bore 38 will not be aligned, and thus, the fastener 38 may not be inserted to clamp the clamping yoke 30 to the input shaft 11 or output shaft 12.

Further, if the connection assurance device 20 is not positioned at the proper axial position on the input shaft 11 or output shaft 12, the groove 17 is not aligned with the securing hole 26 and fastening bore 33. Accordingly, if the securing hole 26 and fastening bore 33 are aligned, the fastener 38 may be partially inserted therein. However, because the groove 17 is not aligned with the securing hole 26 and fastening bore 33, the fastener 38 will be blocked from complete installation by the outer periphery of the input shaft 11 or output shaft 12 intersecting the fastening bore 33. Thus, the axial position of the connection assurance device 20 may be adjusted to the proper axial position so that the groove 17, securing hole 26 and fastening bore 33 are aligned so that proper final assembly may be completed. Likewise, if the connection assurance device 20 is installed at an improper rotational position on the input shaft 11 or output shaft 12, the groove 17 will not be aligned with securing hole 26 and fastening bore 33. Thus, the fastener 38 may not be inserted to clamp the clamping yoke 30 to the input shaft 11 or output shaft 12 in an improper position.

In accordance with the exemplary embodiments above, proper positioning of a clamping yoke 30 may be ensured on an input shaft 11 of steering gear, an output shaft 12 of a steering column or both. Accordingly, improper positioning, which may lead to failure of the connection, may be avoided and reliability may be improved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An intermediate steering shaft connection assembly for a steering column comprising:
 a shaft extending along a first axis, the shaft comprising a mounting portion proximate an end, the mounting portion comprising an axially facing wall spaced from the end;
 a clamping yoke configured to be coupled by a mounting bore to the mounting portion of the shaft; and
 a connection assurance device interposed between the shaft and the clamping yoke, the connection assurance device comprising:
  a first plate having a shaft opening formed therein, the shaft opening positioned about the first axis and configured to receive a mounting portion of the shaft, the first plate comprising one tab disposed proximate the shaft opening, the tab having an axially extending portion extending axially substantially parallel to the first axis from the shaft opening a predetermined axial distance to a projection portion, the projection portion spaced from the shaft opening by the predetermined axial distance and extending radially inwardly a predetermined radial distance at an angle from the axially extending portion toward the first axis, the projection portion of the tab abutting the axially facing wall when the connection assurance device is installed on the shaft to a desired axial position; and
  a second plate connected to and extending from the first plate in a direction of the first axis, the second plate having a securing hole formed therein configured to receive a fastener, the securing hole having a second axis extending therethrough, the second axis spaced from the first axis and extending in a direction perpendicular to the first axis.

2. The intermediate steering shaft connection assembly of claim 1, wherein the clamping yoke includes a mounting bore formed therein, the mounting bore configured to receive the mounting portion of the shaft therein.

3. The intermediate steering shaft connection assembly of claim 2, wherein the clamping yoke includes a fastening bore extending along the second axis and aligned with the securing hole.

4. The intermediate steering shaft connection assembly of claim 3, wherein the mounting portion of the shaft includes a groove extending in the direction of the second axis and aligned with the fastening bore and securing hole.

5. The intermediate steering shaft connection assembly of claim 4, wherein the fastening bore, securing hole and groove are configured to receive a fastener when the connection assurance device and clamping yoke are properly positioned on the shaft.

6. The intermediate steering shaft connection assembly of claim 1, wherein the mounting portion comprises an axially extending flat surface extending from the axially facing wall to the end, and an inwardmost end of the projection portion of the tab is configured for alignment with the flat surface when the connection assurance device is installed on the shaft in a desired radial position.

7. The intermediate steering shaft connection assembly of claim 1, wherein the shaft opening includes a plurality of splines spaced axially away from the clamping yoke and the mounting portion includes a splined segment, the plurality of splines configured to interlock with the splined segment so as to limit relative rotation between the connection assurance device and the shaft.

8. The intermediate steering shaft connection assembly of claim 1, wherein the at least one shaft is an input shaft of a steering gear.

9. The intermediate steering shaft connection assembly of claim 1, wherein the at least one shaft is an output shaft of a steering column.

10. The intermediate steering shaft connection assembly of claim 1, wherein the steering shaft includes an input shaft of a steering gear and an output shaft of a steering column.

11. A connection assurance device for properly positioning a clamping yoke on a shaft of an intermediate steering shaft connection assembly, the shaft comprising a mounting portion proximate an end, the mounting portion comprising an axially facing wall spaced from the end, the connection assurance device comprising:
a first plate having a shaft opening formed therein, the shaft opening having a first axis extending therethrough and configured to receive a mounting portion of the shaft, the first plate comprising one tab disposed proximate the shaft opening, the tab having an axially extending portion extending axially substantially parallel to the first axis from the shaft opening a predetermined axial distance to a projection portion, the projection portion spaced from the shaft opening by the predetermined axial distance and extending radially inwardly a predetermined radial distance at an angle from the axially extending portion toward the first axis, the projection portion of the tab configured to abut an axially facing wall of the shaft when the connection assurance device is installed on the shaft to a desired axial position; and
a second plate connected to and extending from the first plate in a direction of the first axis, the second plate having a securing hole formed therein configured to receive a fastener, the securing hole having a second axis extending therethrough, the second axis spaced from the first axis and extending in a direction perpendicular to the first axis.

12. The connection assurance device of claim 11, wherein the second plate extends orthogonally from the first plate.

13. The connection assurance device of claim 11, wherein the shaft opening includes a plurality of splines.

14. The connection assurance device of claim 11, wherein the first plate is asymmetrically shaped.

15. The connection assurance device of claim 11, wherein the second plate is asymmetrically shaped.

16. The connection assurance device of claim 15, wherein the second plate has three or more sides.

17. The connection assurance device of claim 15, wherein the second plate is formed in the shape of a trapezoid.

18. The connection assurance device of claim 11, wherein the mounting portion comprises an axially extending flat surface extending from the axially facing wall to the end, and an inwardmost end of the projection portion of the tab is configured for engagement and alignment with the flat surface when the connection assurance device is installed on the shaft in a desired radial position.

\* \* \* \* \*